Figure 1:
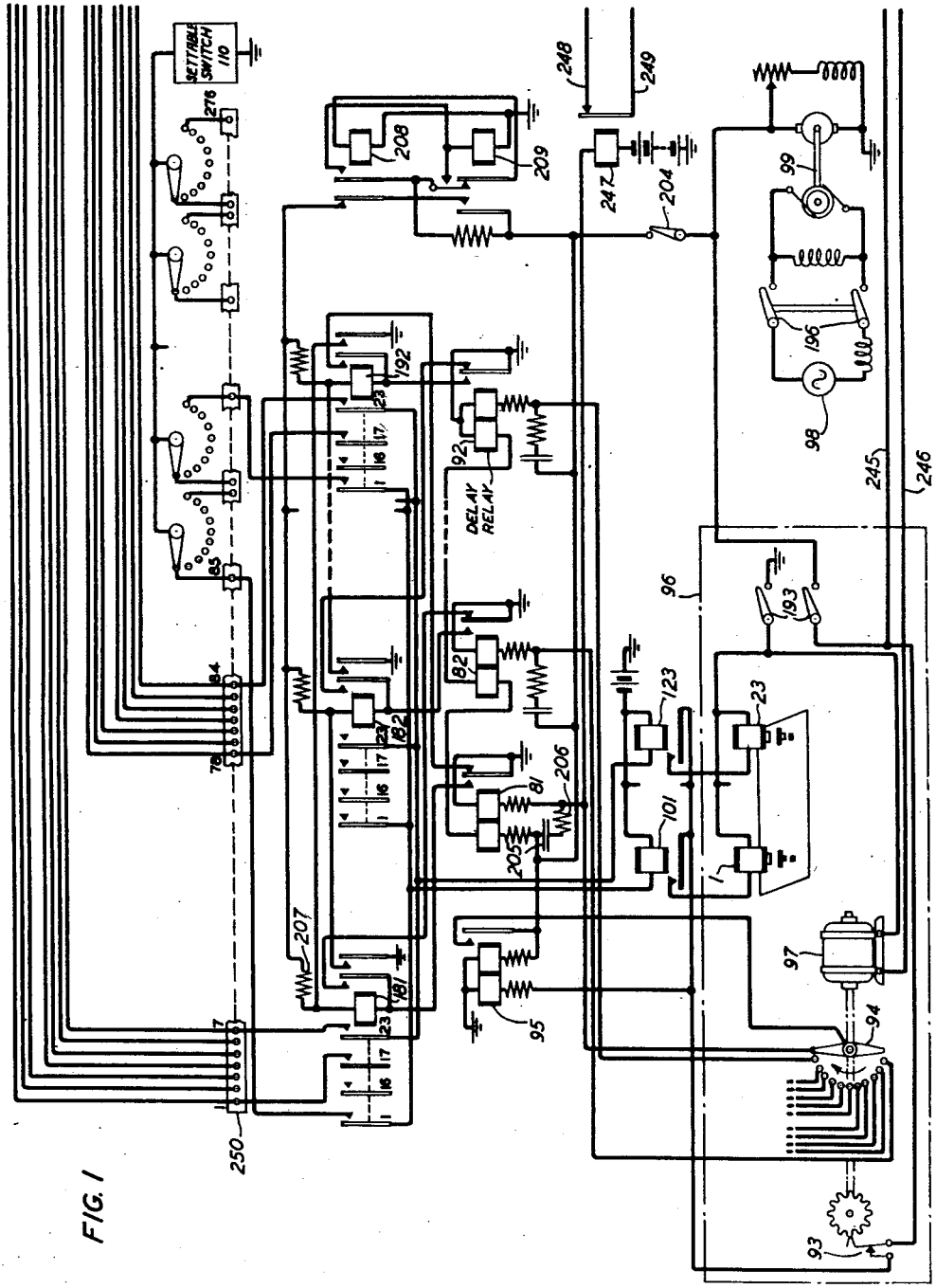

Aug. 10, 1943.  T. L. DOWEY ET AL  2,326,204
AUTOMATIC QUESTIONNAIRE
Filed Sept. 24, 1940  3 Sheets—Sheet 1

INVENTORS: T. L. DOWEY
C. A. LOVELL
BY
P. C. Smith
ATTORNEY

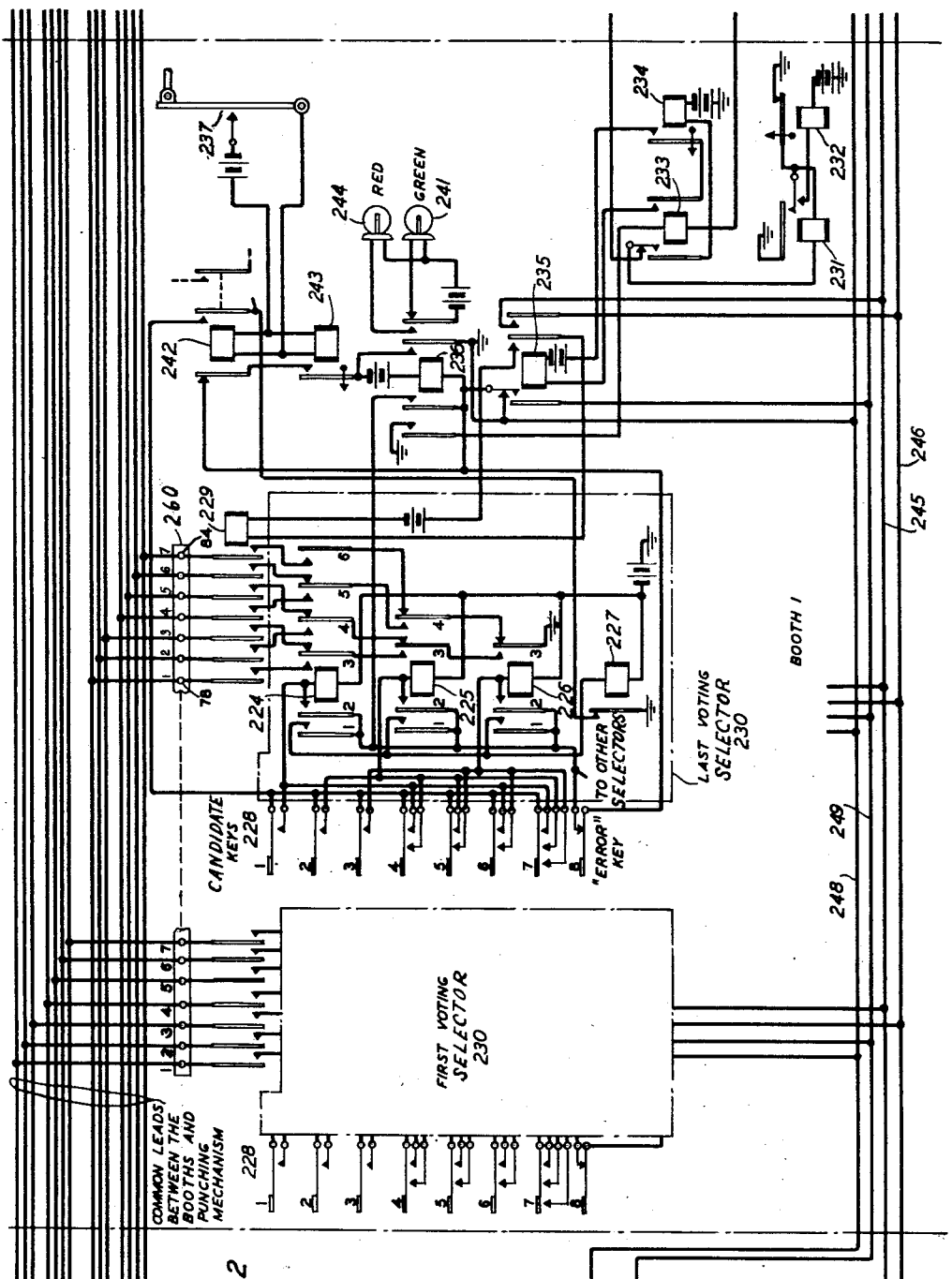

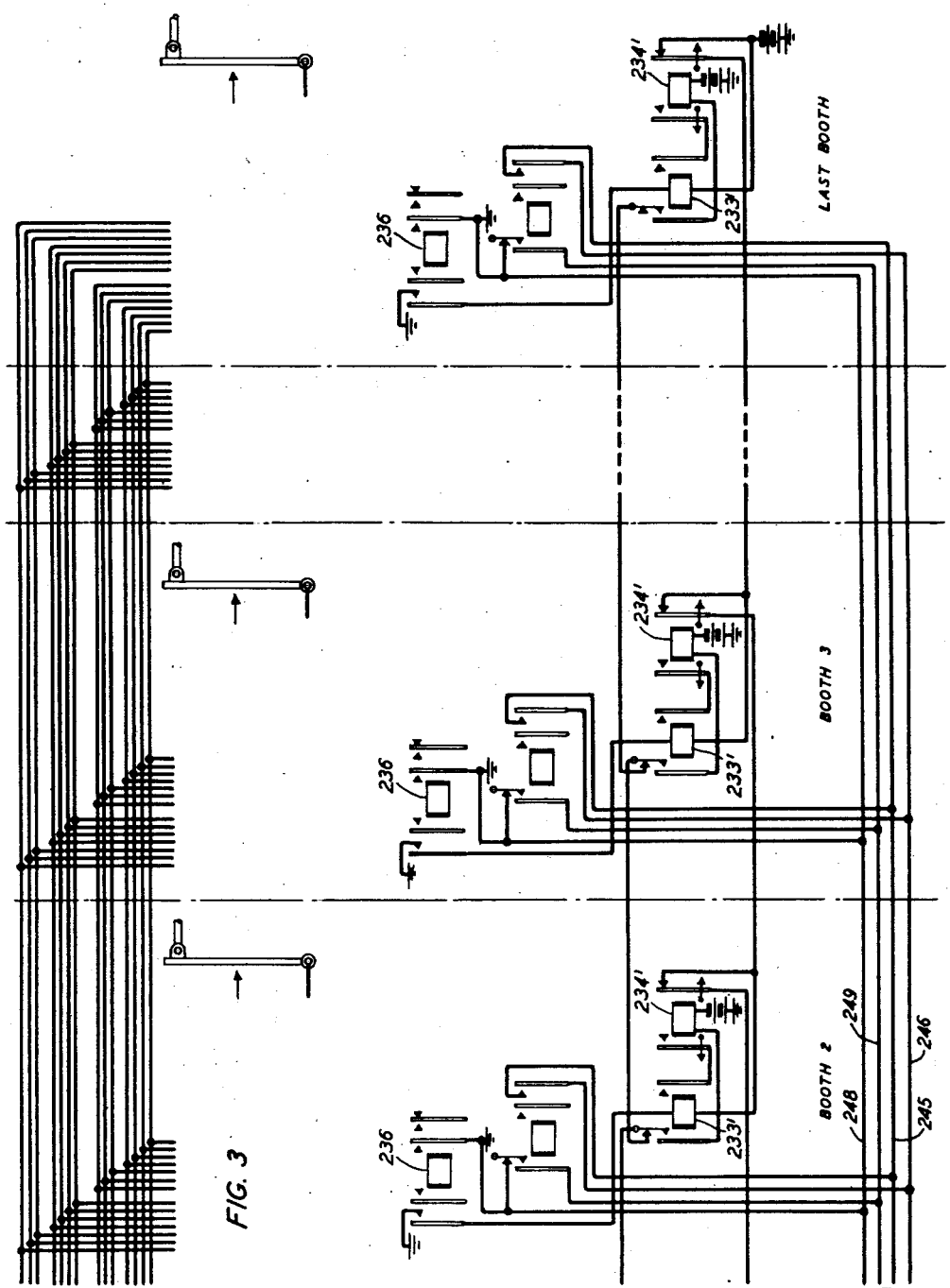

Patented Aug. 10, 1943

2,326,204

UNITED STATES PATENT OFFICE 2,326,204

AUTOMATIC QUESTIONNAIRE

Thomas L. Dowey, Summit, and Clarence A. Lovell, Maplewood, N. J., assignors to Bell Telephone Laboratories, Incorporated, New York, N. Y., a corporation of New York Application September 24, 1940, Serial No. 358,058

6 Claims. (Cl. 235—50)

This invention relates to automatic questionnaires and particularly to an automatic recorder mechanism which is adapted to make a punched record of a selected choice in each of a given group of choices. The selected choices are recorded on settable selectors or equivalent means that are accessible to a punching mechanism in a preferred order which insures an accurate discrete record for each "vote," speedy recording, non-interference among the several individuals utilizing the selectors to express their selected choices, and secrecy as to the choices expressed.

The invention may be utilized in any field where surveys of any kind are desirable such as, for instance, the gathering of public opinion on any specific question, educational and psychological tests and examinations of all kinds, consumer preference studies and the like and, of course, in public voting at elections.

The object of the present invention is to provide means whereby one of a number of prepared answers to any question can be locked in settable selectors and thereafter recorded therefrom in a preferential and orderly manner upon a card or its equivalent by a suitable and commercially available recording mechanism which has access to the selectors. Since each record is individual to one operating cycle of the recording mechanism, although the record itself may contain one choice for each of a plurality of different subjects, the records thus made may later be analyzed either by inspection or by mechanical means for the tabulation of the data contained thereon.

Obviously such an automatic questionnaire mechanism has a number of advantages of which among the more important may be listed the simple and convenient facilities offered the voter to register his vote, the opportunity to automatically check, count and classify the returns with much greater speed and accuracy than at present since the punched cards may be conveyed to a central point for sorting and tabulating while leaving the voting mechanism free for other purposes, and quick and accurate tabulation of the vote by running the cards through any suitable tabulating device by which the various votes are sorted, classified and counted.

As applied to an automatic questionnaire recorder the invention may be adapted, for instance, to provide a selector for each question upon which an expression of opinion is desired and the "questionee" would simply note down a selected one out of a given number of prepared answers to each question by operating a key individual to the answer, a push-button, a dial switch or any other manually settable means provided for each of the available answers to any question for which a selector is furnished. These selectors are accessible to a punching mechanism and, when set in response to the voter having performed the required voting operations they are connected to said punching mechanism which then proceeds through an operating cycle during which the setting of the selectors is scanned and holes are punched on a card in the several places thereon reserved for the purpose, to indicate which answers have been given by the voter, there being a space for each answer reserved upon the card. One card would then contain the complete set of answers obtained from one questionee.

Any number of selectors or groups of selectors can be served by one punching mechanism, and one of the features of this invention is a control circuit by which such selectors or groups of selectors are connected, when operated, to the machine in a desired order or preference for recording the vote contained on each of said selectors or group of selectors, and the number of such selectors or group of selectors which may be so tied in with the punching mechanism depends, of course, upon the speed with which said punching mechanism can punch an individual card which is to contain the vote setting of one selector or group of selectors. Since this operation can ordinarily be performed in a fraction of a second, and since it usually takes some minutes for a voter to decide upon the selection of prepared answers before him, the punching mechanism will, in the overwhelming majority of cases, punch a card and clear out to release the selector or group of selectors, connect itself with some other selector or group of selectors which have been given a vote setting, and be ready again for connection with the previous selector or group of selectors before the same can be reset by a succeeding vote registration.

Accordingly, another feature of the invention is a control circuit wherein means are provided by which once a selector or group of selectors has a choice registered therein, such selector or group of selectors is not made available for further voting until the vote registered therein has been recorded on a card by the punching mechanism.

In one adaptation of the invention, the selector or group of selectors may each be enclosed in a so-called voting booth, and the operative association of any selector or group of selectors of a booth with the punching mechanism is made dependent upon the condition of the booth curtain or door, whichever it may be.

Accordingly, another feature of the invention is the provision of means whereby if a selector or group of selectors is enclosed in a booth, said selector or group of selectors is operatively connected to the punching mechanism when the booth is closed, and the punching mechanism is thereafter operated to punch the ballot in accordance with the setting of the selector or group of selectors, said selector or group of selectors being kept in a locked condition against the possibility of fraudulent change during the operating cycle of the punching mechanism while, as an additional safeguard, succeeding voters are warned away from the booth by appropriate pilot signals.

These and other features of the invention not only provide the voter with simple and convenient facilities for registering his vote, but further provide those concerned with the elections thus made with an economical, efficient and fool-proof device which is not susceptible of fraudulent manipulation, which need not be taken out of service and kept in unchanged condition to preserve the voting record, since this can be done simply by storing the cards, and which reduces the number of voting booths required because of the speed with which the punching mechanism disposes of the ballots.

Referring, now, to the detailed description and operation of the invention, which is hereunder disclosed by way of illustration with reference to its application as an election voting machine, the drawings consist of three sheets of which the first, labeled Fig. 1, is a circuit diagram of the punching mechanism and connecting conductors leading to the various selectors, the second labeled Fig. 2, is a circuit diagram of a plurality of selectors in the first booth and circuit, and the third, labeled Fig. 3, shows the control circuit extending to all the other booths including the last, as well as such circuit elements in each of the booths which are operatively associated therewith.

In the present invention use is made of the punching mechanism described in Patent 2,263,291, issued to T. L. Dowey et al. on November 18, 1941, and while the circuit diagram of said mechanism is shown in Fig. 1 and the same is believed to be amply described hereunder, yet reference is made to the above-mentioned patent for a more complete description of such parts of the mechanism as are not more fully described herein.

Referring, now, more particularly to Figs. 1, 2 and 3, in which Fig. 2 should be placed at at right of Fig. 1 and Fig. 3 at the right of Fig. 2 for a complete disclosure of the invention, four voting booths are shown of which the circuits of booth No. 1 are shown in full while those of booths No. 2, No. 3 and the last, which are identical to those of booth No. 1, are omitted in their similar parts and briefly indicated otherwise. Each booth is provided with as many selectors 230 as there are questions for which a given number of prepared answers may be given, there being as many different settings of the selector as there are prepared answers to the question. If the automatic questionnaire is to be used for political elections, each selector may represent an elective office and each of the settings thereof may be reserved for one of the candidates for that office. Each selector comprises a group of one or more relays and a set of candidate keys by which the relays are operated. In the "last" selector of booth No. 1, the selector shown therein by way of illustration comprises the group of four relays 224—227 (including the lock-out relay 227) to provide for seven selective choices, a group of eight candidate keys 228 including the "error" key 8 by means of each of which the answers to a given question or selections for a given office are made, a multi-contact relay 229 by which all the selectors in one booth are simultaneously connected over a common group of leads to the punch magnet control relays 101—123 of the punching machine whose circuits and equipment are shown in Fig. 1, and a control lock-out circuit for all booths compristing relays 231 and 232 which are common to all booths and relays 233, 234, 235 and 236 which are individual to a booth, identical relays in all other booths being primed but otherwise identically designated.

In the operation of the invention, and referring particularly to booth No. 1, in Fig. 2, at the top right-hand corner thereof is shown a pair of contacts 237 which may be assumed to be connected with the booth curtain. When the curtain is open, contacts 237 are open and lamp 241, which may be assumed to be green in color to indicate that the booth is available for voting, is lighted over an obvious circuit through the right outer back contacts of relay 236 which is normal at this time. If a voter now occupies the booth and draws the curtain to initiate the operation of the equipment, contacts 237 are closed and obvious circuits are completed for relays 242 and 243, the last-mentioned of which has slow-releasing characteristics. Relay 242 has a pair of contacts on its right side for each selector 230 in the booth and when the relay operates and these contact pairs are closed, ground is applied from the contacts of relay 227 in each selector 230 through the appropriate contact pair, to the movable member of each of the candidate keys in each of the selector key-sets 228.

The voter now operates the appropriate candidate key in each of the registers 230 to register his vote on the question or elective office for which the particular selector is reserved. Let it be assumed, by way of illustration, that the invention is being used for a political election and that a particular selector 230 is reserved to a field of candidates of one of the elective offices. Each key, except the error key 8, is reserved for one of the candidates of whom we may suppose there are seven, by way of illustration, ranging from key 1 for Mr. A to key 7 for Mr. G, inclusive, key 8 being an "error" key which permits the voter to change his vote after he has depressed one of the keys of the selector. Thus key No. 1 will be used in voting for Mr. A, key No. 2 in voting for Mr. B, and so on down to and including key No. 7 which will be used for voting for Mr. G. If, for instance, the voter elects to vote for Mr. A, he depresses key 1, whereupon a circuit is completed for relay 224 extending from grounded battery through the winding of said relay, contacts of key 1, right innermost contacts of relay 242, contacts of lock-out relay 227, to ground. Relay 224 operates, locks over a holding circuit traceable over its No. 2 contacts, contacts of "error" key 8, normally made contacts of relay 235, to ground. It further completes a ground path to terminal 7 of terminal block 260 extending from ground on the No. 3 back contacts of relay 226, No. 4 back contacts of relay 225, No. 6 front contacts of relay 224 to terminal 7 on terminal block 260 via the contacts of relay 229 when operated as described hereinafter.

In the same way, if the voter elects to vote for Mr. B, he operates key No. 2 whereupon a circuit is completed for relay 225 to the same ground and battery as before; this relay locks over a holding circuit traceable over its No. 2 contacts by a previously traced path and applies ground to the No. 6 terminal of terminal block 260, extending from ground as already traced to the No. 4 front contacts of relay 225, No. 5 back contacts of relay 224 to terminal 6. Other choices are made by the depression of each of the remaining voting keys; the relays operated in response thereto and the terminal grounded thereby on terminal block 260 to register the choice are readily apparent from the following chart:

| Key operated | Relays operated | Terminal grounded |
|---|---|---|
| 1 (Mr. A) | 224 | 7 |
| 2 (Mr. B) | 225 | 6 |
| 3 (Mr. C) | 226 | 5 |
| 4 (Mr. D) | 224, 225 | 4 |
| 5 (Mr. E) | 225, 226 | 3 |
| 6 (Mr. F) | 224, 226 | 2 |
| 7 (Mr. G) | 224, 225, 226 | 1 |

Should the voter discover that he has voted for the wrong person or for any other reason wishes to change his vote from that registered for the person whose key he has operated, he operates the "error" key 8 and thereafter operates the key reserved for the individual for whom he desires to vote. The operation of the "error" key 8 releases (say) relay 224 inasmuch as its holding circuit is under control of the contacts of the error key, and the depression of the numerical key thereafter will operate one or more of the relays 224—226 according to the above table to ground the terminal individual to the choice indicated by the newly operated key.

The above selector circuit is purely illustrative and may be enlarged to include a larger variety of choices or may be contracted to a minimum choice of two. Where a choice is to be made for each office of a number of offices, a corresponding number of selectors is provided as shown, and the number of relays provided for each of the selectors will depend, of course, upon the field of candidates running for the office, the voting for each of which is to be registered by the depression of a key reserved to the candidate in the selector reserved for the office. The maximum number of choices which may be made is, ultimately, a function of the capacity of the punching machine and the number of elective entries for each office. In the present embodiment of the invention, the punching machine whose circuit is illustrated in Fig. 1 has a capacity for making nine hundred and sixty punches in twelve rows of eighty punches to the row, and it is assumed, therefore, but only by way of illustration, that the selecting facilities of a booth may provide, if necessary, for a maximum of 80 selectors for as many questions or elective offices with a maximum of 12 prepared answers for each question or 12 entries for each office. The operation of the invention is being illustrated with selectors of smaller capacity in order not to encumber the drawings and in order to provide punch space on the card for the punching of auxiliary information, but it is obvious that there is no limit to the number of questions or the number of prepared answers for each question which can be disposed of by the present invention except as imposed by the limitations of the structure of the punching mechanism.

In the selector circuit illustrated, the lock-out relay 227 operates over an obvious circuit completed through a set of contacts on each of the relays 224, 225 and 226, and, when operated, opens the operating path to each of said relays so that the depression of any other key following the depression of one of them will have no effect whatever in disturbing the choice made and registered except if the "error" key 8 is operated first as described above, in which event relay 227 will release with the relay or relays operated, and the selector thus reset to normal for the successful operation of any of its voting keys.

It should be further noted that the effectiveness of the error key 8 is dependent upon the contacts 237 of the booth curtain being closed. As will be shown further on, when the booth is opened subsequent to voting, the locking circuit of the selector relays 224—226 is transferred, by the operation of relay 236, to ground over its left inner contacts. Hence error key 8 is made ineffective to cause by its operation, any change in registration. Moreover, the candidate keys are equally ineffective since, with relay 242 released, no ground is available to close the circuit of any of the selector relays.

Assuming, now, that the voter has registered his vote by depressing the key reserved for the candidate of his choice, in each of the selectors, he opens the curtain to leave the booth and, in doing so, opens contacts 237, thereby opening the circuit of relays 242 and 243. Since relay 243 is slow-to-release, relay 242 will make its left back contacts before relay 243 will break its front contacts whereupon there is a momentary interval of continuity between the two sets of contacts which completes the circuit of relay 236 therethrough. This relay operates, locks itself under the control of the normally made contacts of relay 235, provides a locking circuit for operated selector relays, such as 224, through left inner contacts of relay 236 so that the selected choice can now no longer be disturbed by any tampering with the "error" key 8, as described above, opens the circuit of the green lamp 241 and closes that of the red lamp 244 indicating by this change of signals that the booth is not available, and completes a circuit for relay 233 of the control circuit, extending from ground on left outer contacts or relay 236, winding of relay 233, normally made contacts of slow-release relay 234' of booth No. 2, serially through the normally made contacts of relay 234' of every other booth, including the last, to battery. It is clear that if at this time any relay 234' is operated, which fact indicates, as will be shown, that the associated booth is connected to the punching mechanism of Fig. 1, the circuit of relay 233 of booth No. 1 cannot be closed and that booth, therefore, will have to wait its turn for connection with the punching machine until the booth locked in therewith has cleared out, which fact will be evidenced by the release of its associated relay 234'. In the interval of waiting, however, the registration which is to be recorded from the selectors of booth No. 1 cannot be disturbed inasmuch as the candidate keys 1–7 are made ineffectual by the release of relay 242 consequent to the opening of contacts 237 of the booth curtain and by the operation of relay 227 of each selector.

Relay 233, in operating, breaks a continuity to the left contacts of relay 233' through which the circuits of associated relay 234' are completed and further completes a circuit for the associated relay 234, which circuit extends from battery through the winding of said relay, left operated contacts of relay 233, winding of relay 231, contacts of relay 232 to ground. Both relays 231 and 234 operate, relay 231 locking under control of its own contacts and completing an obvious circuit for relay 232 which operates; relay 234 operating to complete, with the right contacts of relay 233, the circuit of relay 235. Relay 235, upon operating, completes the circuit of multicontact relay 229 which connects the selector circuits in booth No. 1 to multiples which run between the terminal block 250 of the punching mechanism and the terminal strip 260 of each of the various booths, completes a path over its right outer contacts to conductors 245 and 246 to start the operation of the punching machine or recorder as further described hereunder, and reroutes the locking circuit of the selectors through its left make-before-break contacts so that this circuit will now extend to ground through the contacts of relay 247 via conductors 248, 249 which multiple to the several booths.

Since the terminal connections of terminal block 260, which are grounded by the selector circuit and are to be recorded on a card or ballot have been now extended to the terminal block 250 of the punching mechanism via the common multiples, and since this piece of apparatus has been started functioning by the closure of conductors 245 and 246, the punching mechanism, in the manner to be described below, goes through its operating cycle and punches the card or ballot in the spaces indicated by the grounded terminals set up in the selector circuits.

Referring, now, to Fig. 1 there appears in the lower left-hand corner thereof a broken line rectangle 96 which represents a commercially available punching machine. This machine may be supplied with a large stack of cards of an appropriate size and, when set in operation, will punch holes therein at the rate of approximately ninety cards per minute. The maximum number of holes punched by the type of machine herein used to illustrate the operation of the invention is nine hundred and sixty arranged in twelve rows of eighty each. In Figure 1, only so much of the apparatus included in the commercially available machine is indicated as is necessary to a clear understanding of the invention.

The machine consists essentially of eighty punch magnets, which are adapted to punch a row of eighty holes in a card and to repeat the operation twelve times, thus producing a maximum of nine hundred sixty holes. Obviously this number of punches is not needed to record the usual selection of choices in an ordinary questionnaire or to select the usual number of candidates in an election and so, in the event that a smaller punch field is desired, only the appropriate number of magnets need be wired up. In the present embodiment of the invention it is assumed that there will be twelve voting selectors in each booth, each having a choice of one out of seven for each selector, thus making a punch field of 84 holes. Since the machine punches twelve times to the cycle, the number of magnets required to punch the maximum number of voting registrations would be 7. To this must be added an additional sixteen magnets to provide for the punching of auxiliary information as shown below which makes the total number of magnets required 23 instead of 80. Hence the magnets of the punching machine are illustrated in the drawings by the two magnets numbered 1 and 23, it being assumed that the remainder of these magnets are indicated by the missing numbers between 1 and 23 and by the multiple connection shown. These magnets are for causing the proper operation of corresponding punches. The machine is powered by a motor 97 which is here shown only in connection with the emitter or commutator device 94 and the circuit breaker or interrupter 93. It is understood, however, that the motor 97 will operate the mechanical parts of this machine.

Power is supplied from a source of power 98 operating a motor generator set 99, or it may be taken directly from any suitable direct current voltage source available. For convenience of illustration, one side of the generator of this set is shown grounded and the other side is connected to a terminal of a switch 193 which is used to connect the source of power to the electrical circuits of the machine. The motor, however, will not be operated until relay 235 of the booth to be serviced has operated and completed the path between conductors 245 and 246, at which time the motor 97 will be connected directly from ground, the upper blade of switch 193, the motor 97, conductor 246, right outer contacts of relay 235, conductor 245, through the lower blade of switch 193 to the source of power 99. Under this condition the motor 97 will run continuously.

During the operating cycle of the machine 96, the circuit breaker or interrupter 93 will cause the isolation relay 95 to operate twelve times, each for a very short interval of time, over a circuit extending from ground through the left winding of said relay, circuit breaker 93, lower blade of switch 193, the power source 99 to ground. Assuming that the emitter or commutator device 94 has moved its brush to the point where relay 81, for instance, will be operated, then, during this period and while the isolation relay 95 is operated, a circuit may be traced from ground, the right-hand winding of relay 81 and its associated resistance, brush of commutator device 94, contacts of relay 95, through the switch 204 to the source of power 99, causing said relay to operate. Relays 81 to 92, inclusive, one for each of the twelve subgroups, as well as the relay 95, are comparatively light duty sensitive relays inasmuch as their respective periods of energization are extremely short. Hence, these relays (relays 81 to 92) are provided with a polarizing circuit through their left-hand windings in series and each is provided with a condenser, such as 205. The connection through the contacts of the isolation relay 95 and the commutator device 94 will short-circuit this condenser 205 and its associated resistance 206, but as soon as relay 95 becomes deenergized, this condenser will again charge from the source of power 99 and through the right-hand winding of relay 81 and this charging current will tend to hold the relay 81 operated for a period beyond the period of its energization through the contacts of relay 95.

The operation of relay 81 closes a circuit for a multi-contact relay 181, said circuit extending from ground, front contacts of relay 81, the winding of relay 181, resistance 207, back contacts of relay 208, the left outer front contacts of relay 209 (which is operated at this time as explained below), through the switch 204 to the source of power 99. In the normal operation of the apparatus, however, relay 192 will have remained operated until this operation of relay 81 through a locking circuit involving its own right inner contacts and the back contacts of relay 81. Therefore, the winding of relay 181 will be short-circuited at this time through a connection from the upper terminal of the winding of relay 181 to ground on the right outer contacts of relay 192. Therefore, upon the operation of relay 81 an energizing circuit for relay 181 is closed but does not become effective until the relay 192 has become completely deenergized and restored its contacts to their normal positions. Similarly, once relay 181 has closed its contacts it locks itself and remains operated independently of relay 81, through a locking circuit which runs from its right inner contacts through the back contacts of relay 82, to ground. It will remain operated, therefore, until relay 82 has opened its back contact. Relay 181, on the other hand, will, in its turn, prevent the operation of relay 182 until it has opened the shunt circuit extending from the upper winding terminal of relay 182 through the right outer contacts of relay 181 to ground. The same sequence of operations is followed with all the other relays in this series, and, in this way, their operation is made inherently synchronous with that of the circuit breaker 93 and, therefore, with the speed of the punching machine.

Each of the twelve multicontact relays 181 to 192, inclusive, has a plurality of contact springs whereby the windings of relays 117 to 123, inclusive of the group of relays 101 to 123, inclusive, are connected to terminal connections such as 1 to 7 on terminal block 250, which are merely representative of the entire 276 terminals of which 84 extend to the selection multiple running through all the booths and connected to the armature of relay 229 in each of said booths, and the remainder, relays 101 to 116, inclusive, to the arcs of the settable switch 110 which is set to record the auxiliary information. By way of example, suppose that terminal 1 of terminal block 260 has been selectively grounded by the operation of the first selector circuit of booth No. 1. Therefore, when relay 181 is operated, relay 117, being connected to a grounded terminal will become operated. By the same token, when relay 182 is operated, then, whatever terminal 8–14 of terminal block 245 has been grounded by the setting of the second selector will cause the operation of the corresponding relay in the group of relays 101–123. During the time that relay 181 is operated, the circuit breaker or interrupter 93 will momentarily close, whereupon each one of the magnets 1 to 23 which is connected to an operated relay 101 to 123 will become operated and cause a punched hole to appear in the record card at an appropriate place.

Other terminals 85–276 of terminal block 250, leading through the contacts of these multicontact relays 181–192 to the relays 101–116 may be connected to terminals such as 85 and 276. These terminals are connected to ground by the settable switch 110 by the setting of which incidental information may be recorded on the card. Thus the first four columns on the card may be reserved for an indication of its serial number with column 1 containing a punched mark that indicates thousands, columns 2 a punch mark that indicates hundreds, column 3 a punch mark that indicates tens and column 4 a punch mark that indicates units. Columns 5, 6, 7 and 8 may be used for indicating or recording the booth number of some designation of the location where the recording machine was employed; columns 9, 10, 11 and 12 may be used to indicate the exact time at which the punched record was made. Thus, a punch mark in the tenth row of column 9 might be used to indicate 10 A. M., a punch mark in any one of the twelve rows of column 10 might be used to indicate the postmeridian hours, while columns 11 and 12 may be used to indicate minutes in tens of minutes and units, respectively. Columns 13 and 14 may indicate days in tens and units, and columns 15 and 16 may indicate years in tens and units, while columns 17 to 23, inclusive, may be reserved for indicating the condition of the "voting" terminals 1–84. Thus there are sufficient punch spaces available on the card for all the miscellaneous information desired and the same may be made accessible to the punching magnets 1–23 through the settable switches 110.

It will be understood, of course, that the entire eighty columns may be used for recording the condition of an equivalent number of voting terminals and that, in such an event, the number of punch magnets may be increased to provide for the punching of the incidental information.

There are commercially available a number of well-known analyzing machines which will accommodate cards of the above nature so that if a large number of such punched cards are placed in the machine they will be mechanically analyzed and the voting statistics obtained therefrom.

The function of relays 208 and 209 is to prevent an unduly heavy load on the source of power, resulting in blowing the relay fuses, when the system is started in operation and when switch 204 is closed. Since at that time no one of the relays 81 to 92, inclusive, or multicontact relays 181 to 192, inclusive, is operated and no one of the condensers, such as 205, is charged, the closure of the switch 204 might cause the momentary simultaneous operation of all these relays. Upon the closure of switch 204 each of the condensers, such as 205, becomes charged and the charging current is enough to cause the operation of the associated relay so that relays 81 to 92, inclusive, will all simultaneously move their armatures to close energizing circuits for relays 181 to 192, inclusive, respectively. However, at this instant, due to the deenergized condition of relays 208 and 209, these energizing circuits are ineffective.

Upon the closure of switch 204 the source of power 99 is connected through the normal contacts of the inner left-hand armature of relay 209, and thence through the winding of relay 208 to ground. Relay 208 operates, whereupon the source of power is connected through the left inner contacts of relay 208 and thence through the winding of relay 209 to ground. Relay 209 operates, and now the source of power 99 is connected through the alternate contacts of the inner left-hand armature of relay 209 directly to the winding of relay 209 to hold this relay energized. Due to the energization of relay 209, relay 208 will become deenergized. Thus, after switch 204 is closed, relays 208 and 209 will go through this cycle of operations and will thereafter remain in this condition with relay 209 steadily operated. Therefore, the source of power 99 will be connected to the resistances, such as 207, and thence to the windings of relays 181 to 192. However, this cycle of operation of relays 208 and 209 prevents the connection of the source of power to these points until after the condensers, such as 205, have become fully charged and relays 81 to 92 have returned to normal.

When the emitter 93 transmits its last pulse, relay 247 is operated in parallel with relay 81, thereby releasing relay 236 and the register relays. Relays 233, 234 and 235 then release in turn, the punching machine is stopped and all circuits are returned to the unoperated condition with the green lamp 241 lighted to show that the booth is clear. Under the assumed condition, namely, that no other voting registrations are turned in just before or during the recording of the registration in booth No. 1, the operation at any of the other positions would be exactly the same.

To illustrate the chain of progression between one booth and another, assume that while booth No. 1 is recording, booth 3 and the last booth are being vacated subsequent to having been used for voting. Their respective relay 236 would lock, thus making the booth registers inoperable thereafter and their respective relays 233' would operate. Relays 234' of each of these booths, however, cannot operate under these circumstances because the circuit proceeding from their windings towards the left is interrupted as long as relay 233 of booth No. 1 stays operated. Furthermore, the circuit of the last relay 234' is interrupted a second time by relay 233' at booth No. 3. When relay 233 at booth No. 1 is released, therefore, only relay 234' at booth No. 3 will operate. It is important to note that when this occurs, the chain of progression will have skipped the idle booth No. 2 without any loss of time whatever, and of course, this would be true no matter how many idle booths had intervened. When relay 233' at position 3 is finally released, relay 234' at the last booth will operate, the idle booths again being skipped.

The foregoing shows how the chain of progression advances from left to right. To illustrate a further contingency, assume that while booth No. 3 is tied in with the punching machine, voting registrations are being turned in at booth No. 2 as well as at the last booth. In this case, relay 236 of booth No. 2 will operate and lock, but relay 233' of this booth cannot operate because the circuit from its winding proceeds toward the right and is interrupted at relay 234' of booth 3 which is operated at this time. Even when relay 234' of booth 3 releases, relay 233' of booth 2 will still not operate because all the relays 234' (including relay 234) are slow-release, and before relay 234' of booth 3 will have restored the circuit, it will be opened again by relay 234' of the last booth. If this provision is not made, relays 233' and 234' at booth 2 might operate and the last booth will have been missed in favor of booth 2 and the progression will have failed.

To illustrate how the cycle is recommended, assume that the last booth is tied in with the punching machine and that voting registrations from two or more booths have accumulated at the left. Relay 236 at each of the booths will operate and lock but none of the booth relays 233' will be operated because of the dependence of their respective circuits upon the right contacts of relay 234' of the last booth, which relay is operated while the booth is tied in with the punching machine. Now when relay 234' of the last booth releases, the circuit is restored simultaneously to the relays 233' at all the waiting booths to the left. These relays all start to operate and it is necessary to insure that only relay 234' of the farthest left waiting booths is permitted to operate. This is the function of relays 231 and 232. These relays have stayed operated throughout the progression, the battery connection for relay 231 having been maintained unbroken as the different make-before-break contacts of relays 233' operated successively while, conversely, relay 231 has always provided a ground for the different relays 234'. However, with the release of relay 233' of the last booth, the battery connection for relay 231 is finally broken and relay 231 starts to release along with relay 234' of the last booth. Relay 232, however, is slow-release and, during the interval between the release of relay 231 and the release of relay 232, there will be no ground connection for any relay 234' whose associated relay 233' has operated. Relay 232 is adjusted so that it does not release until the slowest relay 233' has operated. When this has occurred, the only relay 234' connected to the ground circuit will be that associated with the farthest left operated relay 233'. Hence when relay 232 releases, only this relay 234' can operate and a new progression cycle commences in proper sequence. Of course, relays 231 and 232 will also reset.

While I have described my invention in connection with a specific type of voting selector and a specific type of a progressive lock-out circuit controlling the connection of each of the voting booths with the punching machine, it is understood that various other applications and embodiments thereof may be made by those skilled in the art without departing from the spirit of the invention within the scope of the appended claims. For instance, the relay sequence chain might be replaced by a rotating contact arm passing at constant speed over segments each associated with a booth, the speed being such that time for one punching machine operation would be allowed at each segment. The maximum delay would then be of the same order as with the above described relay chain, but it would occur every time a booth was vacated just after the arm had passed the associated segment even though no other booths were waiting. By making the arm rotate much faster, and slow up only on waiting booths, the stepping of the relay chain over idle booths would be approximated and the average delay would be reduced towards that of the chain as a limit.

Also, instead of registration relays and keys for operating the same as illustrated, it would also be feasible to employ dial switches to produce the same result. In this case, when the booth is vacated, the voting dials could be made inoperable until the completion of the recording by using a magnetic clutch or coupling between the knob and the indicator and the contact system of the dial switch. The operation of the associated relay 236 would then open the circuit of the magnetic coupling instead of the key circuit. There would be, of course, no registration relay circuit to require release.

What is claimed is:

1. In an election voting system, a card punching machine, a plurality of voting booths, a vote selecting means in each of said booths comprising a plurality of candidate keys, circuits closable thereby for indicating voting choices, means responsive to the opening of the booth curtain following a closure thereof for connecting the vote selecting means of one booth with said card punching machine, means in said punching machine for punching a card in accordance with the circuits closed in said vote selecting means, and means for locking all vote selecting means of other booths out of connection with said punching machine for the duration of its connection with said vote selecting means of said one booth.

2. In an election voting system, a punch and scanning machine adapted to punch a card, a plurality of voting booths, vote selecting means in each of said booths comprising a plurality of candidate keys, circuits closable thereby for indicating voting choices, means responsive to the opening of the booth curtain following a closure thereof for connecting the vote selecting means of one booth to said punch and scanning machine, means operative following said connection for operating said punch and scanning machine to scan said selecting means and punch the card in accordance with the circuits closed therein, and means for locking all vote selecting means of other booths out of connection with said punch and scanning machine for the duration of its connection with said vote selecting means of said one booth.

3. In an election voting system, a punch and scanning machine adapted to punch a card, a plurality of voting booths each equipped with selecting means comprising manually operative candidate keys and lockable circuits completed thereby for indicating voting choices, means responsive to the opening of the booth curtain following a closure thereof for connecting the vote selecting means of one booth to said punch and scanning machine, means operative following said connection for operating said punch and scanning machine to scan said selecting means and punch the card in accordance with the circuits closed therein, means operative during the connection between said punch and scanning machine with said selecting means for rendering ineffective the candidate keys of said selecting means connected with said punch and scanning machine, and means for locking all vote selecting means of other booths out of connection with said punch and scanning machine for the duration of its connection with said vote selecting means of said one booth.

4. In an election voting system, a punch and scanning machine adapted to punch a card, a plurality of voting booths each having a numerical designation and each equipped with selecting means comprising manually operative candidate keys and lockable circuits completed thereby for indicating voting choices, means individual to each booth responsive to the opening of the booth curtain following a closure thereof for connecting the selecting means of one booth to said punch and scanning machine in the numerical order identified by the numerical designation thereof, means operative following the connection of one of said selecting means to said punch and scanning machine for operating said machine to scan said selecting means and punch a card in accordance with the circuits closed therein, means operative during the connection between said selecting means and said machine for rendering ineffective the candidate keys of said selecting means connected with said punch and scanning machine, and means for locking all vote selecting means of other booths out of connection with said punch and scanning machine for the duration of its connection with said vote selecting means of said one booth.

5. In an election voting system, a punch and scanning machine adapted to punch a card, a plurality of voting booths each equipped with selecting means comprising manually operative candidate keys and lockable circuits completed thereby for indicating voting choices, means individual to each booth responsive to the opening of the booth curtain following a closure thereof for connecting the selecting means of each booth to said punch and scanning machine in the chronological order in which said selecting means are operated, means operative following the connection of one of said selecting means to said punch and scanning machine for operating said machine to scan said selecting means and punch a card in accordance with the circuits closed therein, means operative during the connection between said selecting means and said machine for rendering ineffective the candidate keys of said selecting means connected with said punch and scanning machine, and means for locking all vote selecting means of other booths out of connection with said punch and scanning machine for the duration of its connection with said vote selecting means of said one booth.

6. In an election voting system, a punch and scanning machine adapted to punch a card, a plurality of voting booths each equipped with selecting means comprising manually operative candidate keys and lockable circuits completed thereby for indicating voting choices, each of said circuits including manually operable means for changing the setting of said circuits from a previous setting, means responsive to the opening of the booth curtain following a closure thereof for connecting said vote selecting means of one booth to said punch and scanning machine, means operative following said connection for operating said punch and scanning machine to scan said selecting means and punch the card in accordance with the circuits closed therein, means operative during the connection between said punch and scanning machine with the selecting means of said one booth for rendering ineffective said manually operable means for changing the setting of the circuits in said selecting means, and means for locking all vote selecting means of other booths out of connection with said punch and scanning machine for the duration of its connection with said vote selecting means of said one booth.

THOMAS L. DOWEY.
CLARENCE A. LOVELL.